United States Patent
Salters et al.

(10) Patent No.: US 9,129,671 B2
(45) Date of Patent: Sep. 8, 2015

(54) SEMICONDUCTOR DEVICE IDENTIFIER GENERATION METHOD AND SEMICONDUCTOR DEVICE

(75) Inventors: Roelof H. W. Salters, Waalre (NL); Rutger S. Van Veen, Veldhoven (NL); Manuel P. C. Heiligers, Veldhoven (NL); Abraham C. Kruseman, Eindhoven (NL); Pim T. Tuyls, Mol (BE); Geert J. Schrijen, Eindhoven (NL); Boris Skoric, Den Bosch (NL)

(73) Assignee: NXP B.V., Eindhoven (NL)

( * ) Notice: Subject to any disclaimer, the term of this patent is extended or adjusted under 35 U.S.C. 154(b) by 1701 days.

(21) Appl. No.: 12/296,875

(22) PCT Filed: Apr. 4, 2007

(86) PCT No.: PCT/IB2007/051213
§ 371 (c)(1),
(2), (4) Date: Oct. 10, 2008

(87) PCT Pub. No.: WO2007/119190
PCT Pub. Date: Oct. 25, 2007

(65) Prior Publication Data
US 2010/0070777 A1    Mar. 18, 2010

(30) Foreign Application Priority Data
Apr. 13, 2006    (EP) .................................... 06112656

(51) Int. Cl.
*H04L 9/06*    (2006.01)
*G11C 7/24*    (2006.01)
(Continued)

(52) U.S. Cl.
CPC *G11C 7/24* (2013.01); *G06F 21/73* (2013.01); *H04L 9/0866* (2013.01); *G06F 21/30* (2013.01);
(Continued)

(58) Field of Classification Search
USPC .......... 726/1–7, 16–21, 26–30; 713/168–170, 713/176–180, 189–194; 365/189.011–225.7; 438/14–18; 714/718–723; 380/28–30
See application file for complete search history.

(56) References Cited

U.S. PATENT DOCUMENTS 5,774,545 A * 6/1998 Raghavachari ............... 713/189
5,818,738 A   10/1998 Effing
(Continued)

FOREIGN PATENT DOCUMENTS

WO    0049538 A    8/2000
WO    2004/081948 A1    9/2004

OTHER PUBLICATIONS

Gassend, Blaise, et al. "Silicon physical random functions." Proceedings of the 9th ACM conference on Computer and communications security. ACM, 2002.*
(Continued)

*Primary Examiner* — Madhuri Herzog

(57) ABSTRACT

A method (100) is disclosed of generating an identifier from a semiconductor device (600) comprising a volatile memory (610) having a plurality of memory cells. The method comprises causing (110) the memory cells to assume a plurality of pseudo-random bit values inherent to variations in the microstructure of the memory cells; retrieving (120) the bit values from at least a subset of the plurality of memory cells; and generating the identifier from the retrieved bit values. The method (100) is based on the realization that a substantial amount of the cells of a volatile memory can assume a bit value that is governed by underlying variations in manufacturing process parameters; this for instance occurs at power-up for an SRAM or after a time period without refresh for a DRAM. This can be used for several identification purposes, such as identifying a semiconductor device (600) comprising the volatile memory (610), or for secure key generation by mapping error-correcting code words onto the identifier bit locations. The present invention further includes a semiconductor device (600, 1000) configured to be subjectable to the method (100) of the present invention.

37 Claims, 10 Drawing Sheets

(51) Int. Cl.
*G06F 21/73* (2013.01)
*H04L 9/08* (2006.01)
*G06F 21/30* (2013.01)
*G11C 7/20* (2006.01)
*G11C 16/20* (2006.01)
*G11C 16/22* (2006.01)
*G11C 29/04* (2006.01)
*G11C 29/44* (2006.01)
*G11C 29/50* (2006.01)

(52) U.S. Cl.
CPC *G11C 7/20* (2013.01); *G11C 16/20* (2013.01); *G11C 16/22* (2013.01); *G11C 2029/0407* (2013.01); *G11C 2029/4402* (2013.01); *G11C 2029/5002* (2013.01)

(56) References Cited

U.S. PATENT DOCUMENTS

| | | | | |
|---|---|---|---|---|
| 6,601,008 | B1 | 7/2003 | Madge | |
| 6,738,294 | B2* | 5/2004 | Layman et al. | 365/189.011 |
| 7,216,272 | B2* | 5/2007 | Loh | 714/721 |
| 7,222,040 | B1* | 5/2007 | Nishino et al. | 702/117 |
| 7,554,337 | B2 | 6/2009 | Tuyls et al. | |
| 2003/0204743 | A1* | 10/2003 | Devadas et al. | 713/200 |
| 2004/0035919 | A1 | 2/2004 | Horng | |
| 2004/0053429 | A1* | 3/2004 | Muranaka | 438/17 |
| 2004/0062084 | A1* | 4/2004 | Layman et al. | 365/189.01 |
| 2004/0162959 | A1 | 8/2004 | Adelmann | |
| 2006/0050580 | A1* | 3/2006 | Yamaguchi et al. | 365/201 |
| 2006/0063286 | A1 | 3/2006 | Bidermann et al. | |
| 2007/0208905 | A1* | 9/2007 | Litsyn et al. | 711/103 |

OTHER PUBLICATIONS

Linnartz et al; "New Shielding Functions to Enhance Privacy and Prevent Misuse of Biometric Templates".

Lofstrom et al; "IC Identification Circuit Using Device Mismatch", 2000 IEEE International Solid-State Circuits Conference; Feb. 7, 2000, pp. 372-373.

Linnartz et al; "New Shielding Functions to Enhance Privacy and Prevent Misuse of Biometric Templates"; Audio and Video-based Biometric Person Authentication. Springer Berlin Heidelberg, 2003.

Maeda S et al; "An Artificial Fingerprint Device (AFD): A Study of Identification Number Applications Utilizing Characteristics Variation of Polycrystalline Silicon TFTS"; IEEE Transactions on Electron Devices, IEEE Service Center, Piscataway, NJ, US. vol. 50, No. 6, Jun. 2003. pp. 1451-1458.

Kittler J and Nixon M, Editors; Proceedings of the 3RD Conference on Audio and Video Based Person Authentication, vol. 2688 of Lecture Notes in Computer Science, pp. 238-250, Springer-Verlag, 2003.

Ravikanth, P. S. "Physical One-Way Functions", MIT, 154 pgs, retrieved from the internet at: http://cba.mit.edu/docs/theses/01.03.pappuphd.powf.pdf (Mar. 2001).

* cited by examiner

SEMICONDUCTOR DEVICE IDENTIFIER GENERATION METHOD AND SEMICONDUCTOR DEVICE

The present invention relates to a method of generating an identifier from a semiconductor device comprising a volatile memory having a plurality of memory cells.

The present invention also relates to a method of identifying such a semiconductor device.

The present invention further relates to such a semiconductor device.

For various reasons, it is important to be able to identify a semiconductor device such as an integrated circuit (IC), especially after it has been packaged. For instance, the identification may be required to trace back the test results of a packaged IC obtained before packaging, e.g. the IC test results obtained while the IC was still at the wafer. Alternatively, it may be important to trace back the IC to a particular batch in case of field returns (i.e. returns by a customer) to facilitate the field retrieval of potentially other faulty ICs or to facilitate the evaluation of the production process of the returned faulty IC to improve the production process of future ICs. Also, unique IC identifiers (IDs) may be used for security purposes.

There are several known ways of generating identifiers for ICs. For instance, ICs may be treated with a lacquer after packaging, into which an ID is imprinted. This, however, is a relatively costly process. Also, an identifier may be stored in a dedicated memory location. This has the disadvantage that memory resources have to be sacrificed or added for this purpose.

Alternative identification techniques target the utilization of unique device characteristics for identification purposes. An example of such an identification method is disclosed in 'IC identification Circuit Using Device Mismatch' by Lofstrom et al. in Proceedings of the ISSCC, IEEE Feb. 9, 2000, pp. 372-373. In this paper, an IC is disclosed having an array of addressable MOSFETs. Due to mismatches in the MOSFETs, the drain currents of these devices will be randomly different, thus producing a random voltage signature over a load driven by the array. Since these voltages are reproducible for a single IC, these voltage signatures can serve as an identifier for the IC. A drawback is that this method requires the presence of additional, dedicated hardware on board the IC, which adds to the IC cost.

Another example of such a method is disclosed in US patent application US2004/0162959 A1. The invention disclosed in this application relates to a semiconductor device having a memory, and utilizes the fact that memories tend to have defective memory blocks. Since the location of the faulty memory blocks is more or less random, a semiconductor device can be identified by an identifier that is at least partially based on the location of the defective blocks in the memory. A drawback of this method is that the whole memory has to be investigated to determine the identifier, which is a time-consuming and costly process, especially for large memories.

In US2006/0063286 A1, a method is disclosed for providing an identifier for a semiconductor device based on the selection of one of more semiconductor device circuit elements that have an electrical parameter that is sensitive to process variations, but that also has a time-invariant value, such as the intrinsic start-up value of a collection of cells of a static random access memory (SRAM). The time-invariance of the parameter values of the selected circuit elements is used as an identifier for the semiconductor device. The randomness of the process variations ensures that this identifier is likely to be unique.

However, it has been discovered by the inventors of the present invention that a problem associated with deriving the start-up values from a collection of SRAM cells is that not all SRAM cells have an intrinsic start-up value. Consequently, deriving an identifier from an SRAM start-up becomes a time-consuming exercise because careful evaluation of the SRAM start-up behaviour is required before the cells having an intrinsic start-up value can be reliably identified, which typically requires starting up the SRAM a large number of times before a sufficient degree of reliability can be ensured.

The present invention seeks to provide a more affordable method of generating an identifier from the semiconductor device of the opening paragraph.

The present invention further seeks to provide a semiconductor device to which the method of the present invention can be applied.

According to an aspect of the present invention, there is provided a method of generating an identifier from a semiconductor device comprising a volatile memory having a plurality of memory cells, comprising:

(a) causing the memory cells to assume a plurality of pseudo-random bit values inherent to variations in the microstructure of the memory cells;

(b) retrieving the bit values from at least a subset of the plurality of memory cells; and (c) generating the identifier from the retrieved bit values.

The present invention is based upon the realization that when powering up a volatile memory such as a static random access memory (SRAM), or allowing charge to leak away from a dynamic random access memory (DRAM) for a predefined period of time, at least some of its memory cells have a preference for assuming a particular bit value, e.g. assuming a preferential bit value at start-up or retaining a certain bit value over a predefined period of time. This behaviour, which is different for each individual memory cell, and therefore different for each memory, is caused by differences in the microstructure of the cells. Consequently, by retrieving the pseudo-random bit values from a subset of the memory cells, i.e. bit values that seem random at a single retrieval step but that are reproducible to at least a certain extent because of their correlation with the microstructures of the cells, these values can be used as an identifier, which may be assigned to the semiconductor device to which the memory belongs.

However, it is pointed out that within the context of the present invention, a pseudo-random bit value does not only appear to be a random value in a single retrieval step, but may also exhibit a certain degree of variation between subsequent retrieval steps. For instance, the step of retrieving the bit values from at least a subset of the plurality of memory cells may comprise retrieving bit values from an SRAM, with at least some of the bit values likely to assume a different start-up value if step (a) of the method of the present invention would be executed again. In other words, at least some of the retrieved bit values do not have an intrinsic start-up value, but merely a preferential start-up value; i.e. a cell that adopts different bit values in different start-ups of the SRAM, but may adopt a particular start-up bit value more often than its complementary value.

In case of the generation of the pseudo-random bit values by powering up the memory, although not all the cells of the memory exhibit bit-preferential start-up behaviour, i.e. some cells show more or less random start-up behaviour, it has been determined that the difference in bit values retrieved from the same memory in different start-ups is significantly smaller than the difference in bit values retrieved from different memories. This demonstrates that the bit values retrieved from a memory this way can be used for identification purposes.

In other words, the present invention provides a significant improvement over US2006/0063286 A1, because it has been realized that a certain variation in the start-up values of a selection of cells of a memory is acceptable, because this variation is substantially smaller between different start-ups of the same memory than between the start-up values of different memories. This realization makes the selection of the subset of memory cells to be used for identification purposes much more straightforward than in the case of US2006/0063286 A1, because there is no longer need to identify those cells in an SRAM that have a truly intrinsic start-up value. All that is required when using the selection of retrieved bits for identification purposes is to check whether the difference between bits retrieved from such a memory and an identifier from a database does not exceed a predefined threshold, as will be explained in more detail later.

An important advantage of using the start-up values of the memory cells is that the size of the subset can be kept small; for instance, if the number of unique devices is in the order of ~$10^7$, a subset size of 256 memory cells easily suffices to successfully identify the memories and the semiconductor devices they belong to. Another advantage is that no memory resources have to be dedicated to storing an identifier.

Although for most identification purposes, the bit values retrieved from a single pseudo-random bit value generation step are reliable enough, the method may further comprise repeating steps (a) and (b), which may be done for different power-up voltages and/or different temperatures; and wherein the step of using the retrieved bit values comprises using a combination of the bit values retrieved from the various repeated steps (b).

Repeating the pseudo-random bit value generation, e.g. repeating the memory power-up, and subsequent data retrieval a number of times facilitates establishing which of the memory cells predominantly adopt the same bit value at different power-ups, which identifies these cells as having a bias towards assuming this bit value at power-up. Moreover, memory cells may have different start-up characteristics under different operating conditions such as the applied start-up voltage and the applied operating temperature. By taking these different characteristics into account, an even more reliable identifier can be obtained.

The obtained identifiers may be stored in a database. This facilitates identification of the semiconductor device at a later date.

According to another embodiment, the method further comprises the step of loading a database of identifiers, and identifying the semiconductor device by comparing said retrieved bit values to the respective identifiers of the plurality of semiconductor devices and selecting the identifier that has a best match with said retrieved bit values. Finding the best match between the retrieved bit values and the identifiers in the database of identifiers may comprise determining a difference between the retrieved bit values and an identifier from the database such as a bit drift value or a Hamming distance. This difference may be compared to a predefined threshold to determine whether or not the retrieved bit values and the identifier are similar enough to declare a positive identification of the semiconductor device. Thus, by retrieving a set of bit values from a memory of a device to be identified and comparing it with identifiers based on earlier retrieved bit values, a semiconductor device can be easily identified.

A further embodiment of the present invention enables the generation of a secret key based on the identifier. The semiconductor device may include functionality that requires such a key for its operation. For instance, the semiconductor device may use the key to encode or decode secure communications, or may use the key for validation purposes, e.g. to compare the key with a key received from the outside world to verify if access to protected parts of the semiconductor device should be allowed.

To this end, the method further comprises providing a family of code words, each code word comprising a further plurality of information symbols; selecting one or more code words from the family; creating the key from the information symbols of the one or more code words; and making the key available on the output; and wherein the step of generating the identifier comprises creating a mapping function such that each bit value of the one or more code words is mapped onto a respective memory cell from which a corresponding identifier bit value is retrieved; and saving the mapping function on the semiconductor device Thus, by mapping the bits of a code word, or a plurality of code words in case a single code word does not provide enough information symbols for a secure key, onto the identifier, creating a key from the information symbols of the one or more code words, and saving the mapping information, the identifier from the volatile memory is used as a key generator, because the one or more code words can be retrieved from the volatile memory at a later stage, and the key can be reconstructed from the information symbols of the retrieved code words. The key is made available to an output of the semiconductor device, e.g. to disclose the key to the manufacturer of the device. The key may be modified before making it available; for instance, a public key may be extracted from the generated private key, with only the public key being made available.

Preferably, the semiconductor device comprises means to make the key available to the output, which are disabled, e.g. destroyed, after making the key available to the output to prevent unauthorized retrieval of the key from the semiconductor device. Such means may for instance include code word selection or encoding means.

The mapping function may be implemented in a number of ways. A list of pointers to the respective selected memory cells may be created and stored in a non-volatile memory of the semiconductor device, e.g. a read-only memory, which may be erasable. Alternatively, the mapping function may be implemented by creating a bit table, each bit table cell corresponding with a memory cell of the at least the subset of the volatile memory; and providing each bit table cell with a bit value indicating the presence of the corresponding memory cell in the mapping function. The value of the mapped information symbol may be the product of the bit value and the power-up bit value of the corresponding memory cell.

The mapping function may also be implemented as a permutation table for a set of memory cells. For instance, the mapping function may map the bit values of the one or more code words in a random order, with information defining the random order being needed to successfully retrieve the mapping function. Such information may also be stored on the semiconductor device.

The key may be regenerated in the semiconductor device to allow operation of its key-dependent functionality according to another embodiment of the method of the present invention. According to this embodiment, the method further comprises retrieving the one or more code words from the identifier with the mapping function; error-correcting the one or more retrieved code words; creating the key from the information symbols of the one or more error-corrected code words; and operating the functionality using the key.

Typically, the code word is a code word from a code book of error-correcting code words such as BCH-codes, Reed-Solomon codes, Hamming codes and so on. The use of error-correcting code words has the advantage that variations in the power-up values retrieved in different power-up steps can be corrected in the error-correcting step using the parity bits of the code words. This way, a method for operating key-dependent functionality of a semiconductor device is obtained for which a key cannot be forged, because the key characteristics are based on characteristics that are unique to the volatile memory of the semiconductor device.

Preferably, the code word comprising the key is deleted from memory after the comparison step to minimize the risk of unauthorized access to the key.

According to another aspect of the present invention, there is provided a semiconductor device comprising a volatile memory having a plurality of memory cells; and a controller configured to retrieve, from at least a subset of the plurality of memory cells, an identifier comprising respective pseudo-random bit values inherent to variations in the microstructure of the memory cells. Such a semiconductor device, which may be responsive to an external identifier generation request signal, e.g. from automated test equipment or a computer, is capable of generating an identifier in accordance with the method of the present invention.

In case the identifier is to be used for identification purposes, the semiconductor device may further comprise an output coupled to the volatile memory; and wherein the controller is configured to provide the output with the respective bit values. This enables facile access to the generated identifier. The semiconductor device may comprise a boundary scan (IEEE 1149.1 or IEEE 1500) compliant test access port (TAP) controller for processing such a signal, to which the memory controller is responsive. This has the advantage that the available pins of the TAP can be used, e.g. test data in (TDI) and test data out (TDO) for the communication of the identifier generation request signal and the retrieved bit values.

The memory controller may further comprise programmable memory means for storing the size of subset. This facilitates dynamic configuration of a subset size, which can be advantageous if it is not known how large the batch of semiconductor devices is going to be.

The identifier may also have the purpose of generating a key for authorizing access to the semiconductor device. To this end, the semiconductor device may further comprise an output; for generating the key from the information symbols of one or more code words from a family of code words, each code word comprising a further plurality of information symbols; means for generating a mapping function for mapping the bits of the code word onto respective bit values of the identifier; a non-volatile memory for storing the mapping function; means for communicating the key to the output, which may be disabled if the key has already been generated; an input for receiving a further key; extracting means for extracting the key from the identifier with the mapping function; and authorizing means for authorizing access to the at least part of the semiconductor device, the authorizing means comprising a comparator for comparing the key with the further key.

This semiconductor device benefits from an authorization mechanism that is tamper-resistant because of the fact that the key granting access to at least a part of the semiconductor device is based on a unique property of the volatile memory of the semiconductor device. Even if the semiconductor device would be copied including the mapping function, the copy would not work, because the copied volatile memory would exhibit different power-up behaviour, which would fail to facilitate the reproduction of the selected one or more code words.

The invention is described in more detail and by way of non-limiting examples with reference to the accompanying drawings, wherein:

FIG. 1 shows a flowchart of a method of the present invention;

FIG. 2 schematically depicts retrieved bit values from a semiconductor device using a method of the present invention;

FIG. 3 schematically depicts averaged retrieved bit values from a semiconductor device using a method of the present invention;

Figure 7:
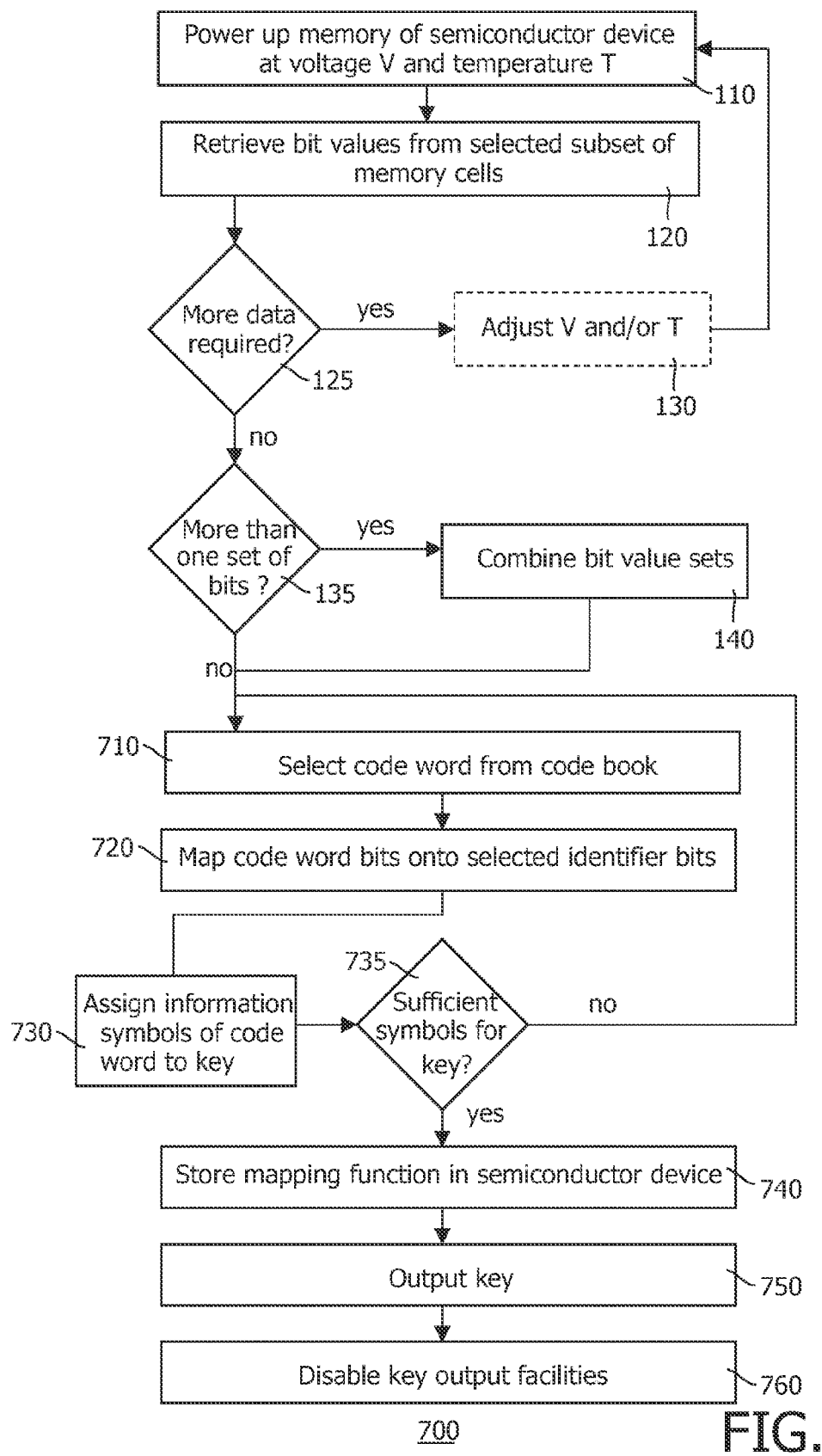
FIG. 7 shows a flowchart of yet another embodiment of the method of the present invention.
Figure 8:
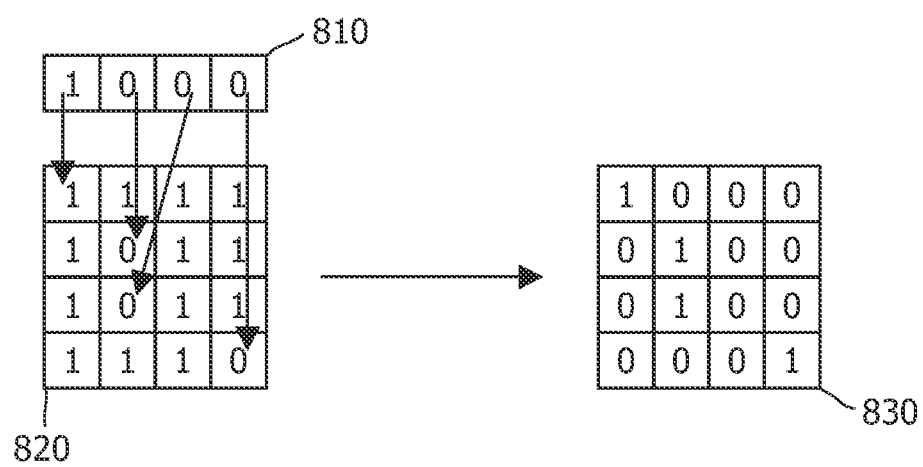
Figure 9:
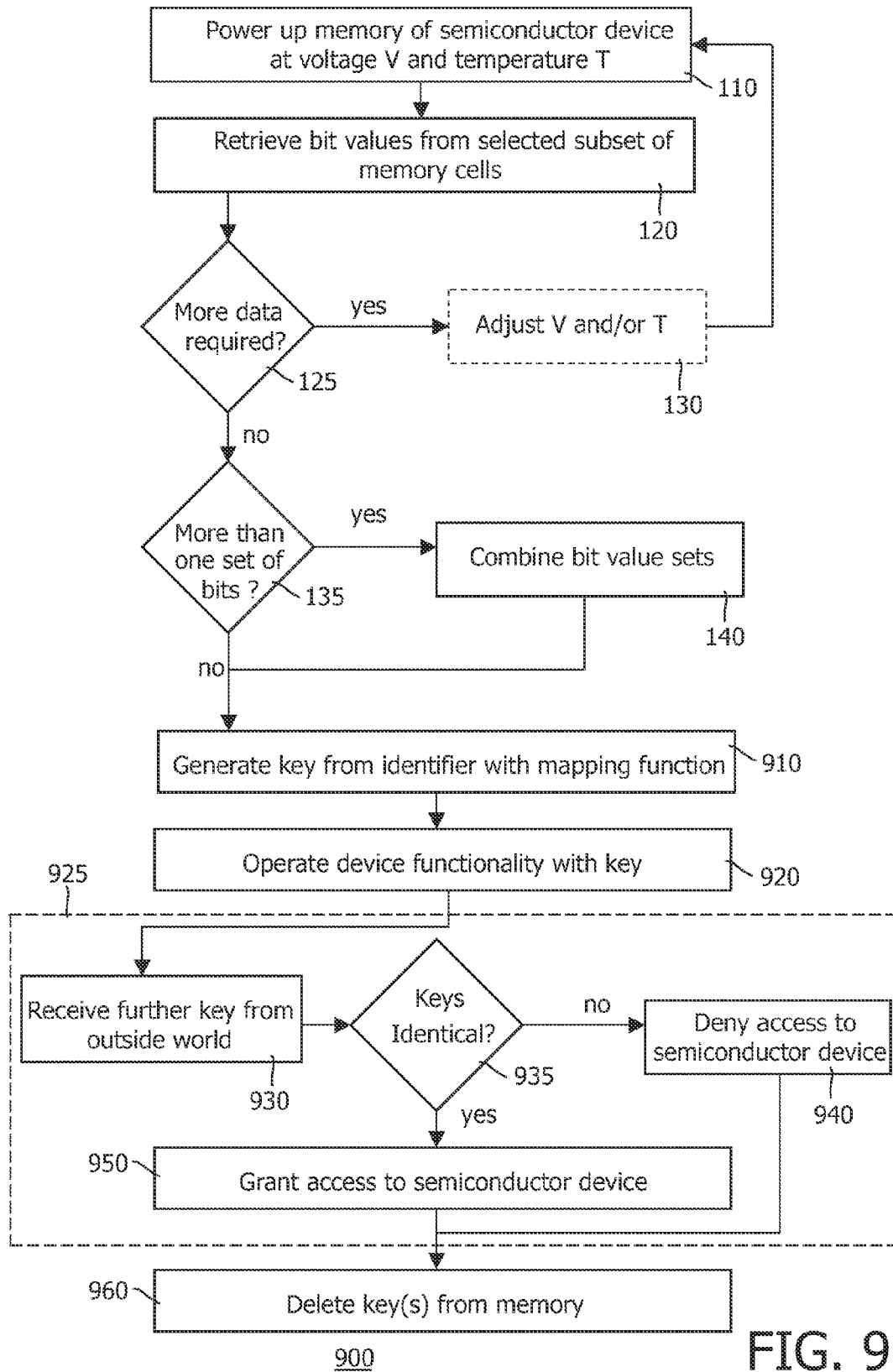
Figure 10:
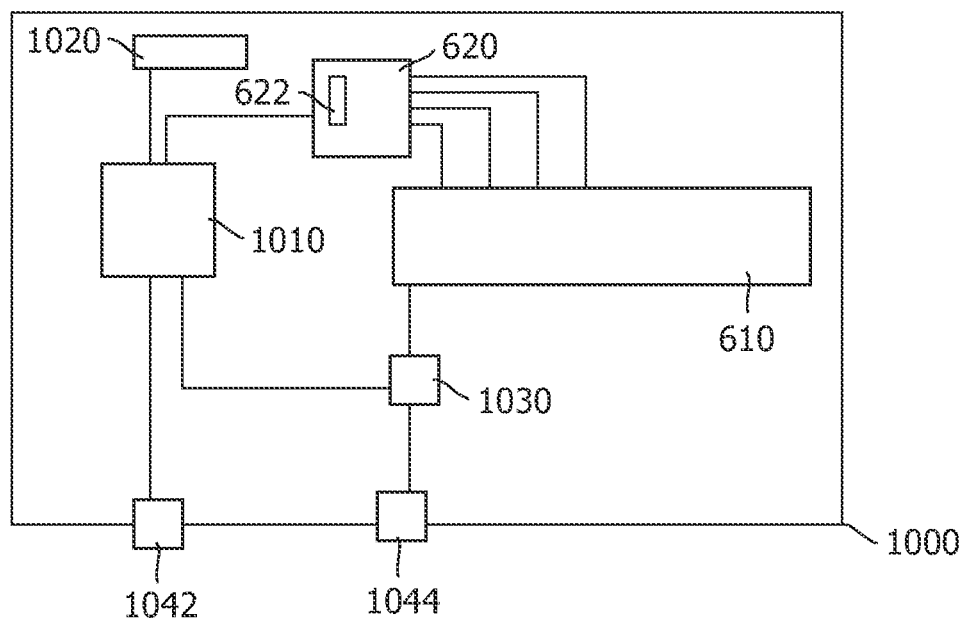

FIG. 8 schematically depicts a mapping function in accordance with an aspect of the method of FIG. 7;

FIG. 9 shows a flowchart of yet another embodiment of the method of the present invention; and FIG. 10 shows another semiconductor device of the present invention.

It should be understood that the Figures are merely schematic and are not drawn to scale. It should also be understood that the same reference numerals are used throughout the Figures to indicate the same or similar parts.

Figure 1:
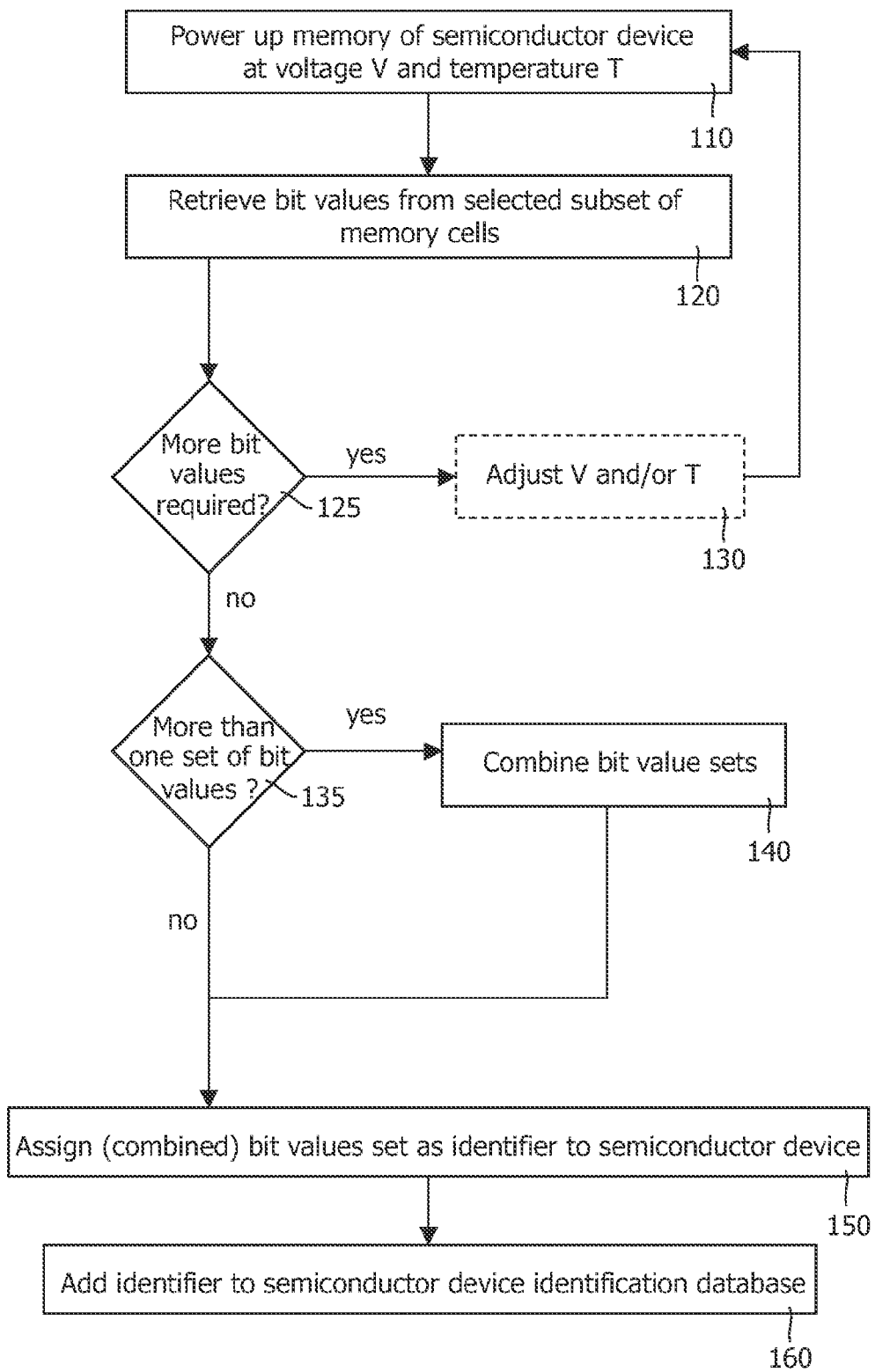

An embodiment of a method to assign an identifier to a semiconductor device having a volatile memory with a plurality of memory cells such as an SRAM is depicted in FIG. 1. In the context of this application, a memory cell is arranged to store a unit data element, e.g. a bit. The method 100 will first be explained for SRAM-type volatile memories, i.e. memories that assume a pseudo-random bit pattern upon power-up. In a first step 110, the memory of the semiconductor device is powered up under predefined operating conditions, i.e. a predefined power-up voltage V and a predefined temperature T to let the cells of the memory assume the respective pseudo-random bit values. It will be obvious that the volatile memory is powered up from a state in which it does not contain any information, i.e. any substantial charge.

The bit values are pseudo-random because they cannot be predicted beforehand but are reproducible to a large extent, as will be shown in more detail later. The randomness as well as the reproducibility of the bit values stems from the fact that each memory cell exhibits unique behaviour that originates from underlying variations in process parameters between memory cells. In other words, every cell has a unique microstructure, which causes the cells to have different behaviour, such as different start-up behaviour for SRAM-type memory cells. It is this difference in behaviour that is exploited in the present invention.

The value for the power-up voltage is chosen such that it exceeds the threshold voltage of the transistors of the memory. It will be appreciated that the actual suitable values of V are dependent of the technology in which the volatile memory is realized; for instance, for a memory developed in a CMOS12 technology, any value V in the range of 0.7V-1.5V may be appropriate, but values outside this range may also be used, e.g. in the case of other semiconductor technologies.

Step 110 may be initiated by an identifier generation request signal, i.e. a signal triggering the semiconductor device to initiate execution of the method of the present invention.

In a next step 120, the data stored in at least a subset of the memory is retrieved. Data acquisition from a part of the memory rather than the whole memory is preferred because reading data from a whole memory can be rather time-consuming, especially when the memory is of significant size, e.g. several megabits. Moreover, some equipment used for reading the bit values from the volatile memory can only cope with limited data volumes, thus preventing read-outs of the whole memory.

In step 125, it is decided if further measurements are required. Different sets of bit values may be retrieved from different retrieval steps, e.g. different SRAM-type memory power-ups, which may be at different temperatures, different power-up voltages or combinations of those different conditions, and each power-up step and data retrieval step being repeated a number of times at fixed T and V to facilitate the detection of variations in start-up bit values for the selected subset of the volatile memory between the various start-ups. This for instance allows the determination of the randomness of the start-up behaviour of each memory cell in the subset, e.g. whether or not the cells are strongly biased towards adopting a particular bit value at start-up. The decision whether or not to perform multiple start-ups and data retrievals is taken in step 125, after which T and/or V may be changed in optional step 130.

If multiple sets of data from such data retrievals are present, which is checked in step 135, these sets of data may be combined in step 140, for instance by averaging the sets of data. This will be explained in more detail below. The retrieved data, which may be data combined in step 140 is assigned as an identifier to the semiconductor device in step 150 and stored in a suitable database in step 160. It will be obvious that the size of the volatile memory subset used for the identifier generation may be chosen such that the size of the identifier is suitable to be stored in the database, e.g. does not lead to excessive database sizes.

Method 100 has been tested on a batch of semiconductor devices called VEQTOR12, which are vehicles used in-house by the applicant for the development, qualification and monitoring of the CMOS12 process. The VEQTOR12 includes an SRAM as an embodiment of a volatile memory. It is emphasized that the bit values in the memory cells of a powered-up volatile memory are the result of the power-up process, because the contents of a volatile memory is erased when the memory is powered down. The bit values, i.e. the bit values stored in the memory cells will either have been generated at random if a cell has no bias towards assuming either a logic '0' or '1', or will have a predictable value if a cell does have a bias towards a logic '0' or '1'. In other words, the bit values in the memory cells are generated by the power-up of the volatile memory.

The assumption of a particular bit value is caused by the fact that the inverters in the inverter pair of an SRAM cell are not perfectly identical due to process variations. Consequently, when the complementary halves of a cell compete to reach a charged state, one of the halves is more likely to win due to these variations.

Figure 2:
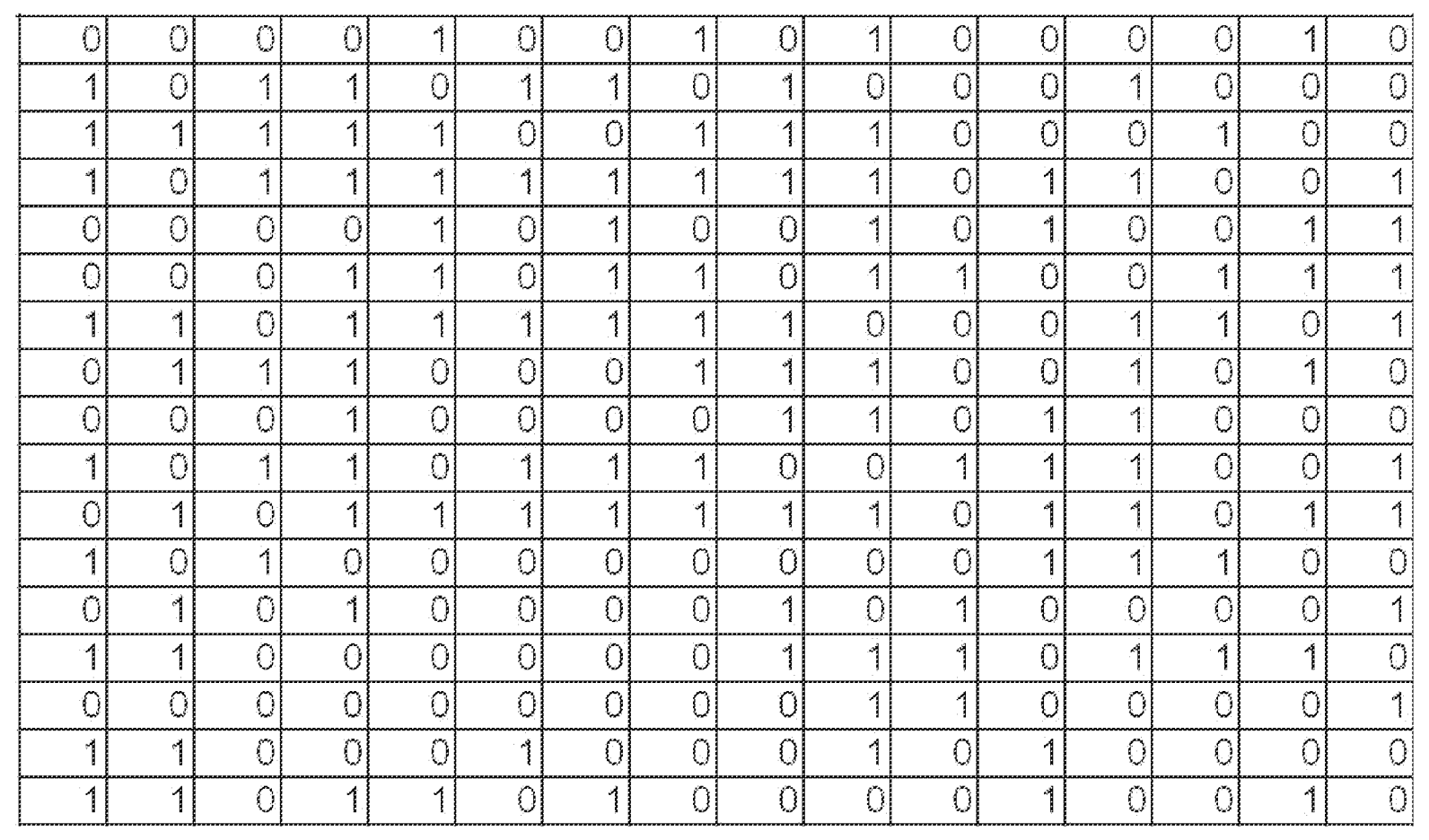
Figure 3:
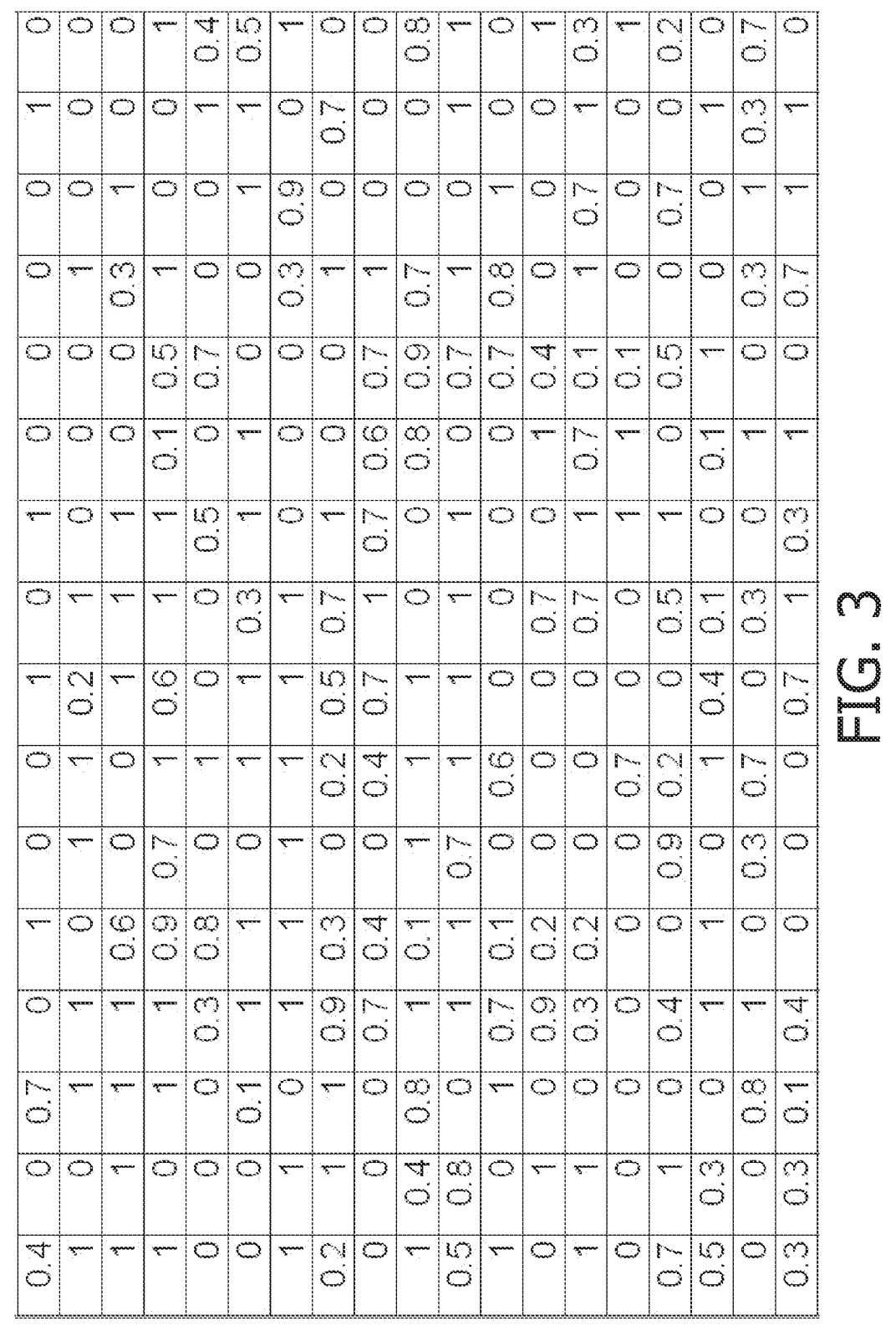

FIG. 2 gives the results of a single power-up and data retrieval step performed on a VEQTOR12 device at V=1.2V and T=25° C. The data retrieval results from a memory subset having a size of 256 bits (16 vectors of 16 bits) are depicted. In this evaluation, the total size of the subset was 2848 bits (FIG. 3 shows a fraction thereof). It is emphasized that the size of the subset was chosen to get reliable statistics in the evaluation. For identification purposes, much smaller subsets can be used; for instance, subsets in the order of a few hundred bits are large enough to identify tens of millions of devices.

TABLE I

| VEQTOR12 SRAM 256 bit subset evaluation | |
| --- | --- |
| Sample | IC 18 |
| Percentage of bits being '0' in measurements | 51% |
| Percentage of bits being '1' in measurements | 49% |
| Percentage of bits that is always '0' or '1' | 62.6% |
| Percentage of bits that is always '0' | 32.4% |
| Percentage of bits that is always '1' | 30.2% |

Figure 4:
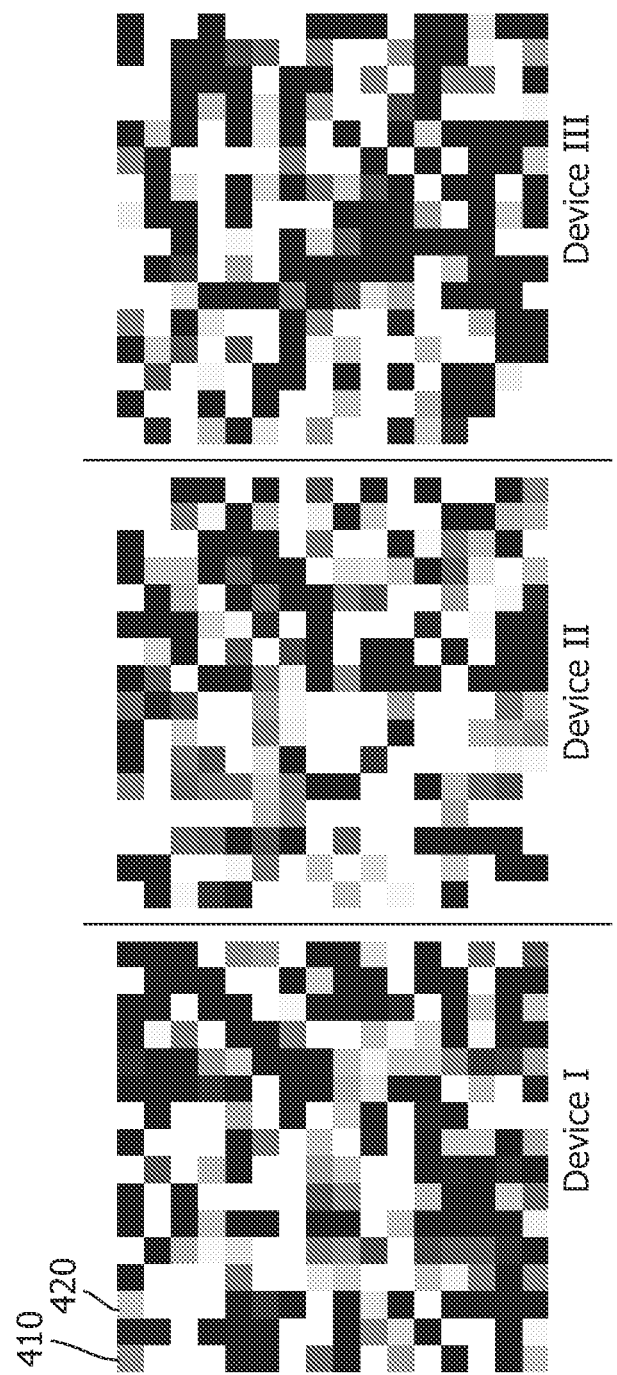
FIG. 4 shows a greyscale mapping of averaged start-up bit values from a subset of memory cells of a number of semiconductor devices using a method of the present invention.

FIG. 3 gives the results of a total of 42 power-up and subsequent data retrieval steps performed at all combinations of V=0.8V, V=1.2V, T=−20° C., T=25° C. and T=80° C., with seven independent power-ups and subsequent data retrievals being performed for each combination of T and V. In FIG. 4, the decimal values represent the average value of the bits retrieved from the corresponding memory locations over all 42 measurements. Table I summarizes the outcome of these measurements for a VEQTOR 12 device (IC 18) that has been randomly selected from a batch of over 100 VEQTOR12 devices. This shows that a substantial number of the memory locations in the selected subset consistently adopt the same bit value upon start-up, which provides a basis for using the retrieved data as an identifier or signature.

A total of three VEQTOR12 devices randomly selected from set of over 100 VEQTOR12 devices were evaluated. For identification purposes, it is important that the variation in the bit values retrieved from a single device is significantly smaller than the difference in bit values retrieved from different devices to avoid assignments of an erroneous identity to a device. There are several ways how this can be calculated. For instance, a Hamming distance, i.e. the total number of bit positions that differ, can be calculated between two sets of binary data. This can be used to calculate a bit drift:

Bit drift=(number of bits that differ/total number of bits)*100%

Table II gives an overview of the bit drift of three VEQCTOR12 devices that were randomly selected from the set.

TABLE II

| | Bit drift (%) | | | | | |
| --- | --- | --- | --- | --- | --- | --- |
| | Device I (IC 18) | | Device II (IC 5) | | Device III (IC 110) | |
| VDD | 0.8 V | 1.2 V | 0.8 V | 1.2 V | 0.8 V | 1.2 V |
| T = −20° C. | 3.9 | 4.4 | 4.6 | 5.6 | 5.0 | 6.1 |
| T = 25° C. | 3.8 | 4.2 | 3.2 | 3.8 | 3.8 | 4.3 |
| T = 80° C. | 3.5 | 4.4 | 2.5 | 4.6 | 2.2 | 3.1 |

The measurements show that per device the bit drift is very low, and typically correspond to Hamming distances of about 10. Moreover, for Vdd=0.8V, there is a clear trend that the bit drift becomes smaller with increasing temperature. Thus, from these sets of data, it can be concluded that more stable signatures (i.e. bit values) can be obtained for moderate start-up voltages VDD at higher temperature.

An indication of the bit drift, or Hamming distances, between devices can be obtained from FIG. 4. Here, a grey scale representation is given from the averaged bit values over the 42 measurements for the three randomly selected devices.

The white squares indicate memory locations that consistently produced logic '1's, the black squares indicate memory locations that consistently produced logic '0's, whereas the grey squares indicate memory locations that produced a mixture of '0's and '1's over the 42 measurements, with darker grey scales indicating lower average values; for instance, location 410 corresponds to an average value of 0.4 whereas location 420 corresponds to an average value of 0.7.

It is immediately apparent from FIG. 4 that the signatures, i.e. the patterns of retrieved bit values, of the three devices are completely different. This is for instance expressed in the Hamming distances between individual sets of retrieved bit values from different devices; the Hamming distance between a set of retrieved bit values of device I and device II each was 121, the Hamming distance between a set of retrieved bit values of device I and device III each was 121 and the Hamming distance between a set of retrieved bit values of device II and device III each was 118. These Hamming distances are an order of magnitude larger than the Hamming distance between two sets of retrieved bit values of a single device. This again indicates that the retrieved data sets can be used for identification purposes.

At this point, it is emphasized that the method 100 can also be used for other types of volatile memories, e.g. DRAM-type memories. In such a memory, the charge leakage rate of different cells differ from each other because of variations in the microstructure of the cells. To this end, in step 110, the powering up of the volatile memory includes storing a set of predefined bit values in the memory cells, e.g. a set of all '1' bits, and step 120 comprises retrieving the subset of bit values after a predetermined time period, in which the time period in chosen such that some but not all of the DRAM memory cells will have lost their predefined bit value. This will give the DRAM memory a signature similar to the signatures shown in FIG. 4, and the identifier generated from the retrieved bit values of the DRAM can be used in a similar fashion.

Figure 5:
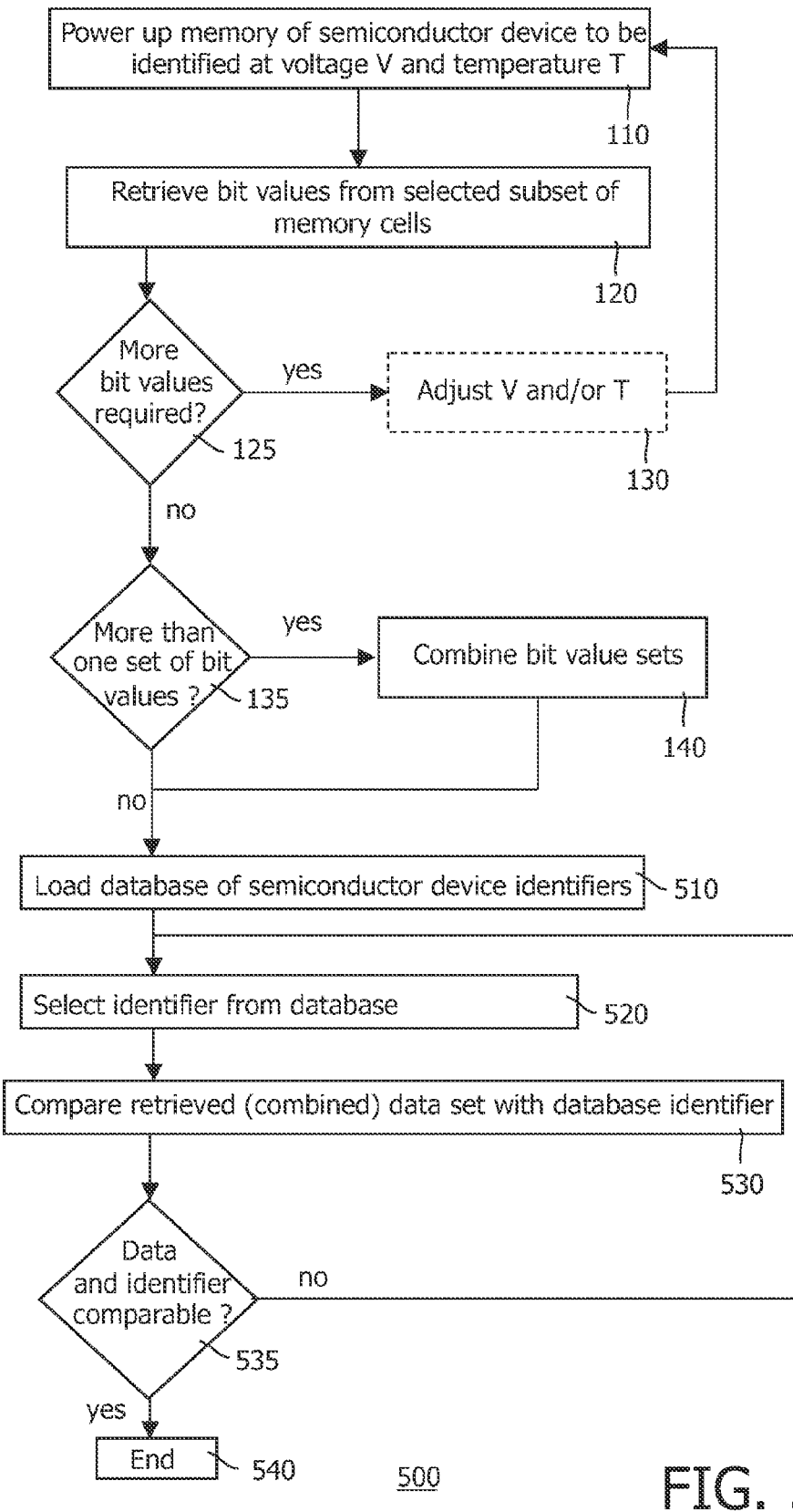
FIG. 5 shows a flowchart of another embodiment of the method of the present invention.

FIG. 5 shows a flowchart of another embodiment of the method of the present invention. In addition to the earlier described steps 110, 120, 125, 130, 135, 140 and 150, the method 500 comprises the step 510 of loading a database of identifiers. The identifiers in this database will be identifiers generated by method 100, and the database will be a database generated in step 160 of the method of the present invention. In other words, the database comprises identifiers extracted from the respective volatile memories of a plurality of semiconductor devices in accordance with the embodiment of the method 100 shown in FIG. 1.

In the next step 520, an identifier is selected from the database, and this selected identifier is compared to the bit values retrieved from the semiconductor device to be identified in step 530. The comparison may be performed in a number of ways. For instance, a Hamming distance or a bit drift may be calculated between the selected identifier and the retrieved bit values. In case of the identifier and/or the retrieved data being based on multiple start-ups and subsequent data retrieval steps, this may be an averaged Hamming distance or bit drift, or other comparison techniques, such as Hamming-type distance calculations in which a weighting factor is used for each memory cell based on the strength of the bias towards the adoption of a reproducible bit value of that cell as shown in FIG. 3, may be used.

The comparison typically yields a value indicating the similarity of the difference between the identifier from the database and the bit values retrieved from the semiconductor device to be identified. In step 535, this value is compared to a predefined threshold, which defines the required level of similarity or the maximum allowed difference between the identifier and the retrieved bit values. For instance, in the experiment performed on the VEQTOR12 devices, it was found that for a single device, the observed Hamming distances between bit values retrieved from different measurements was typically in the order of 5-15, whereas the Hamming distance between retrieved bit values from different devices was typically in excess of 100. Thus, in this particular example, the choice of a threshold in the order of 10-20 should lead to a successful identification of the correct device by means of its identifier in the database.

If in step 535 it is decided that the identifier in the database does not match the retrieved bit values, steps 520, 530 and 535 are repeated until the matching identifier is found, after which the identification is terminated in step 540, which may include knows ways of communication of information concerning the identified semiconductor device, e.g. its batch number, production location and so on to a user.

Figure 6:
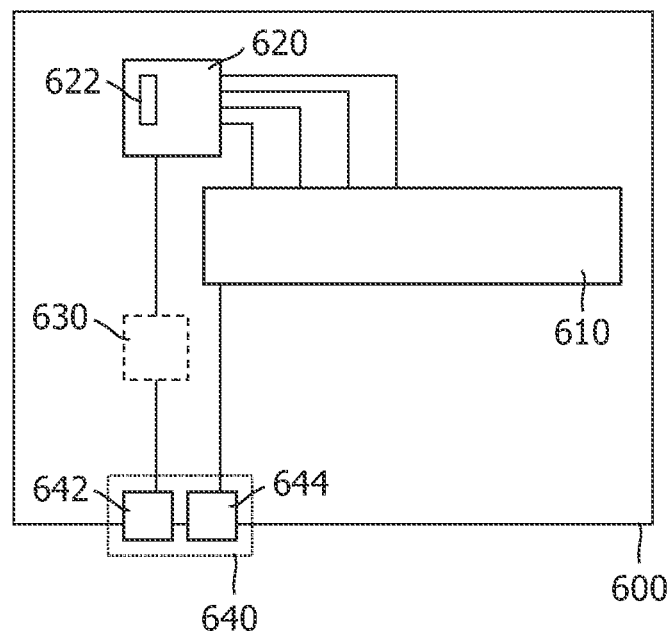
FIG. 6 shows a semiconductor device of the present invention.

FIG. 6 schematically depicts a semiconductor device 600 of the present invention. The device 600 has a volatile memory 610 coupled to a memory controller 620. The memory controller 620 is configured to retrieve pseudo-random bit values from a predefined subset of the memory cells of memory 610 for identifier generation purposes. The pseudo-random bit values are inherent to the microstructure of the corresponding memory cells from which they are retrieved, as previously explained. The controller 620 retrieve the bit values upon a power-up of the memory 610 in case of an SRAM-type memory, or may be configured to, upon a power-up of a DRAM-type memory, store a predefined bit pattern in the memory and retrieve the pseudo-random bit values from memory after a predefined delay, which may be programmable.

The dimension of the subset may be hard-coded in the memory controller 620 or may be programmable. To this end, the memory controller 620 may have a data storage facilities 620, e.g. a small flash memory, one or more suitable registers and so on, to store the programmable dimensions of the subset. The memory controller 620 may be responsive to a signal provided via input 642. The signal typically requests the generation of the identifier, and will therefore also trigger the power-up of the memory 610. Output 644 is configured to receive the data retrieved from the memory 610.

The memory controller 620 may be directly coupled to input 642. Alternatively, the semiconductor device 600 may further comprise an IEEE 1149.1 compliant test access port (TAP) controller 630, which for instance may also be involved with controlling test modes of the device 600. The TAP controller may have an instruction register (not shown) for receiving an instruction from the TAP 640. Since the boundary scan standard allows the use of proprietary instructions, an instruction may be added to the instruction set for the TAP controller 630 that triggers the power-up of the memory 610 and the data retrieval under control of the memory controller 620. Input 642 may be the TDI, and output 644 may be the TDO of TAP 640, and the data path from the memory 610 to output 644 may include a scan chain under control of the TAP controller 630.

It will be appreciated that the present invention is not limited to exploiting the intrinsic variations in the microstructure of the cells of an integral volatile memory device; distributed volatile memories, e.g. a collection of flip-flops, on board a semiconductor device that exhibit such pseudo-random behaviour are equally suited for such exploitation. In any case, the design of the memory cell should preferably avoid a design-based bias towards a particular bit value to allow detection of the aforementioned microstructure-dependent effects.

At this point, it is emphasized that the method of the present invention can also be used to generate identifiers for security purposes, i.e. unique keys for authorizing access to (parts of) an IC, to verify or generate authentic or secure data communications and so on. In the context of the present invention, the authorization of access includes access to content processed by the semiconductor device, e.g. decoders such as set-top boxes.

FIG. 7 shows a flowchart of method 700, which gives a first embodiment of the utilization of the volatile memory signature for key generation purposes. The method 700 starts with steps 110, 120, 125, 130 and 140, which have already been described in the detailed description of method 100. In addition, a code word is selected from a codebook in step 710. Examples of suitable code books are code books that comprise members of a family of error-correction code words; e.g. a BCH-code book, a Hamming code book, a Reed-Solomon code book and so on. Each code word of the codebook typically has a length n with k information symbols and a minimal distance d, with n, k, d being codebook specific positive integers, and each code word preferably has a unique set of information symbols.

The information symbols are bit patterns in the code word, i.e. subsets of the n bits, whereas the code word further comprises a number of parity bits to correct for errors in the retrieval of the information symbols. Hence, the use of error-correcting codes is required in cases where the Hamming distance between the identifier bit values from different start-ups is larger than zero. The theory of error-correction coding is common general knowledge for the person skilled in the art; see for instance Wicker, "Error Control Systems for Digital Communication and Storage", Prentice-Hall 1995, or Lin and Costello, "Error Control Coding Fundamentals and Applications", Prentice-Hall 1983, and will not be further explained for this reason. It suffices to state that the k information symbols of the error-correction code can be used as an authorization key for allowing access to (parts of) the semiconductor device, including specific semiconductor device functionality.

The method of the present invention is a specific example of a so-called 'helper data' method, which facilitates the retrieval of encoded information, e.g. keys, from noisy data. A more detailed description of the theory behind the use of helper data can be found in: J. P. Linnartz, P. Tuyls, *New Shielding Functions to Enhance Privacy and Prevent Misuse of Biometric Templates*; in J. Kittler and M. Nixon, editors, Proceedings of the 3$^{rd}$ Conference on Audio and Video Based Person Authentication, volume 2688 of Lecture Notes in Computer Science, pages 238-250, Springer-Verlag, 2003.

After the code word has been selected, the bits of the selected code word are mapped onto corresponding bit values of the identifier, i.e. onto memory cells from which these identifier bits are retrieved, in step 720. The memory cells may be selected on the basis suitability criteria such as bias towards reproducing the same power-up bit value under different power-up condition, which may be determined by repeating steps 110, 120, 125, 130 and 140 a number of times, as previously explained.

FIG. 8 shows a few schematic examples of how a mapping function of code word may be constructed. The four bits of code word 810 are mapped onto a subset 820 of the volatile memory of the semiconductor device. Here, a 4-bit code word and a 16-bit subset of the volatile memory are shown for reasons of clarity only; typically, larger sizes of the code word 810 and the subset 820 will be used. Moreover, a subset is used by way of example only; the use of the complete memory for the identification purposes is also feasible, as previously explained.

In the mapping, suitable memory cells, i.e. memory cells adopt a bit value at power-up that correspond to the respective bits of the code 810, are selected, as indicated by the arrows between symbol 810 and subset 820. The mapping function may be realized as a table of pointers to the selected memory cells of the subset 820, which may be stored on the semiconductor device, e.g. in a non-volatile memory such as a ROM, PROM or EEPROM. The pointers may be stored in a permutated fashion, wherein the sequence of pointers point to a scrambled ordering of the code word bits: for instance, the first pointer points to third bit of the code word, the second pointer points at the 7th bit of the code word and so on.

Alternatively, a bit table 830 may be formed. Such a bit table 830 serves as a mask or an overlay of the subset 820, and identifies which memory cells are mapped onto the information symbols of the code word. In FIG. 8, the cells of the bit table 830 that are labelled '1' indicate the memory cells of the subset 820 that have been selected for the code word bit mapping. The actual bit value of the bit of the code word 810 typically is the product of the value of the label of the bit table 830 and the power-up bit value of the underlying memory cell. The bit table 830 may also be stored in permutated form.

It will be appreciated that the way the code words are mapped onto the volatile memory is not essential to the present invention. Other, equally feasible, mapping algorithms may be used without departing from the teachings of the present invention.

Returning to FIG. 7, the information symbols of the selected code word are used as the key required by some functionality of the semiconductor device for its operation. Such functionality may include verification of a key received from the outside world with the identifier-based key, encoding or decoding of data communications with the identifier-based key, as well as other known key-based functionality. The information symbols of the code word are assigned to the key in step 730.

It may be that the number of information symbols in a single code word is insufficient for the generation of a secure key. For instance, a code word may provide 16 information symbols while the secure key requires 64 information symbols. This is checked in step 735. If a key requires more information symbols than provided by a single code word, steps 710, 720 and 730 may be repeated until a sufficient amount of information symbols is obtained. The obtained information symbols (IS) from the different code words may be assigned to a single secure key by concatenation:

<key>=<IS word1><IS word2><IS word3><IS word4>

Upon completion of the key generation, the key is made available to the outside world in step 750, while the mapping function is stored on the semiconductor device, e.g. in a non-volatile memory in step 740. The order in which steps 750 and 740 are executed is not critical and may deviate from the order shown in FIG. 7. Preferably, once the key is made available to the outside world, the circuitry on-board the semiconductor device that facilitated this communication is disabled, e.g. destroyed in step 760 to prevent unauthorized parties gaining access to the key. The destruction of the circuitry may be effected using known destruction techniques, e.g. the blowing of fuses in conductive paths critical to the communication, and so on, and may include the disabling, e.g. destruction of the encoder of the code word if present in hardware.

The key may be made available to the outside world in a modified form, e.g. in the form of a public key that is generated from the key mapped on the identifier, i.e. the private key. The theory of security systems using both public and private keys, i.e. asymmetric encryption, is well-known to the skilled person and will therefore not be further discussed.

The flowchart of method 900 as shown in FIG. 9 demonstrates how functionality of a semiconductor device that requires a key for its operation can benefit from using a key as generated in method 700. Method 900 has steps in common with method 100, in particular steps 110, 120, 125, 130, 135 and 140. It is emphasized that in the case of method 900, all these steps may be executed on-board the semiconductor device, which in practice means that adjustment of the temperature in optional step 130 is not feasible unless a heating element is included on-board the semiconductor device. This, however, is not a preferred embodiment.

Upon power-up of the volatile memory, or upon waiting for the memory to lose some of the predefined bit values stored therein, the method 900 further comprises the step 910 of retrieving the key generated by method 700. To this end, the mapping function saved in step 730 is used to retrieve the bits of the code word, or multiple code words if the key includes information symbols from more than a single code word, from the selected memory cells of the volatile memory of the semiconductor device. The retrieved code word is decoded to retrieve the information symbols of the code word. Typically, the decoding step comprises error-correcting the code word to eradicate differences between the power-up values of the identifier from the code word mapping and extraction stages respectively. Typically, the code word can be error-corrected and the information symbols can be retrieved from the error-corrected code word if the Hamming distance between the bit values of the selected memory cells in step 720 and the bit values retrieved from these cells in step 120 of method 900, does not exceed the distance d, as is well-known to the skilled person. Step 910 is repeated until all information symbols of the key are retrieved and assigned to the key.

In step 920, the key is used to enable operation of the key-dependent functionality of the semiconductor device. As previously explained, such functionality may include encoding or decoding of secure data communications with the key, e.g. data communications over the internet, verification of a signature of a received message, signing a message to be transmitted with the key and so on, or may include validation of a key provided from the outside world.

An example of the latter is given in part 925 of the method 900, which is shown by way of non-limiting example only. In step 930, a further key is received from the outside world. The key based on the volatile memory identifier and the key received from the outside world are compared in step 935. If the keys are identical then access is granted to the secure parts or functionalities of the semiconductor device in step 950; if the keys do not match, such access is refused in step 940.

The further key may be presented in an encoded form to prevent unauthorized parties getting access to the key by eavesdropping the communication of the further key to the semiconductor device. An example of providing the further key in an encrypted form is to request the generation of a random message from the semiconductor device, encoding the message with the further key, provide the further key to the semiconductor device in the form of the encoded message and decode the message with the key based on the identifier from the volatile memory. If the decoded message corresponds to the random message as checked in step 935, the further key is the same as the key based on the identifier from the volatile memory and access to the semiconductor device may be granted in step 950. It is emphasized that this key-communicating protocol is known per se, and that other known secure communication protocols are equally feasible. In this example, step 910 and 930 may be performed in any particular order; for instance, the execution of step 910 may be triggered by the reception of the further key in step 920.

Generally, it is preferred that the key constructed from the retrieved code words, and the further key received from the outside world if present, is removed, e.g. deleted in step 960 from the semiconductor device upon completion of the operation of the key-controlled functionality to avoid unauthorized access to the key(s). This may be implemented by deleting the keys from the memory in which they have been temporarily stored.

An embodiment of a secure semiconductor device 1000 is schematically depicted in FIG. 10. The semiconductor device 1000 has a processor 1010 on which the error correction encoding and decoding algorithms, i.e. the algorithms for generating and retrieving the code words, are implemented in software. The processor 1010 may be responsive to an external signal source (not shown) for generating a key in accordance with method 700 of the present invention. Alternatively, the processor 1010 may generate such a key on the first power-up of the volatile memory 610 only. The processor 1010 is configured to instruct the controller 620, which may be embedded in the processor 1010, to retrieve the identifier from the memory 610. The processor is further configured to evaluate the identifier and map the bit values of the code word generated by the processor 1010 onto suitable identifier bit values, i.e. onto suitable memory cells.

The semiconductor device further comprises a non-volatile memory 1020 for storing the mapping function of the code word bits onto the memory cells. The processor 1010 may be coupled to an output 1044 via a destructible communication circuit 1030 for communicating the generated key to the output 1044. The destructible communication circuit 1030 may, by way of non-limiting example, comprise blowable fuses in the signal path from the processor 1010 to the output 1044; other known destruction techniques are equally applicable. Typically, the communication circuit 1030 will be disabled once the key has been communicated to the output 1044.

The processor 1010 is further configured to perform a function that requires the identifier-based key. For instance, the processor 1010 may be coupled to an input 1042 for receiving a further key, which may be in encoded form as previously explained, for the purpose of authorizing access to protected functionality of the semiconductor device 1000. The processor 1010 may be configured to, upon reception of the further key, retrieve the identifier-based key from the memory 610 using the mapping function stored in non-volatile memory 1020. To this end, the processor 1010 is configured to force a power-up, preceded by a power-down if required, of the volatile memory 610 after which the controller 620 is triggered to retrieve the bit values of the memory cells in accordance with the mapping function. Alternatively, the processor 1010 may be configured to program a DRAM-type volatile memory with a predefined bit value set and instruct the controller 620 to retrieve the bit values from the memory 610 in accordance with the mapping function after a predefined delay.

The processor 1010 is configured to decode the retrieved bits from the memory 610 to retrieve the information symbols of the key and to compare the key with the further key received from input 1042 in order to grant access to the key-protected parts of the semiconductor device 1000 in the case of matching keys. It will be appreciated that the processor 1010 may alternatively be configured to operate other functionality that requires the use of the identifier-based key, such as data communication encoding and/or decoding.

Finally, the processor 1010 is configured to delete the key and the further key, if present, from its internal memory, e.g. registers, or other memory after completion of the comparison.

It is emphasized that the aforementioned software-based embodiment of semiconductor device 1000 is by way of non-limiting example only; other embodiments, for instance in which a hardware-implemented error-correcting encoder and decoder, and/or key-based data communication encryption or decryption blocks, and/or a hardware-implemented comparator of the key and the further key are present, are equally feasible. Such implementations are known per se and will not be further explained for reasons of brevity.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to an advantage.

The invention claimed is:

1. A method of generating an identifier from a semiconductor device comprising a volatile memory having a plurality of memory cells, the method comprising:
   (a) causing the memory cells to assume a first plurality of pseudo-random bit values inherent to variations in the microstructure of the memory cells;
   (b) retrieving, by a processor circuit, the pseudo-random bit values from at least a subset of the plurality of memory cells;
   (c) causing the memory cells to assume at least a second plurality of pseudo-random bit values inherent to variations in the microstructure of the memory cells; and
   (d) generating the identifier by averaging at least some of the first plurality pseudo-random bit values and the at least second plurality of pseudo-random bit values.

2. A method as claimed in claim 1, further including:
   receiving an identifier generation request signal;
   performing steps (a)-(d) in response to the reception of said signal, the plurality of pseudo-random bit values inherent to variations in the microstructure of the memory cells being determined based upon a charge leakage rate of the memory cells, and the steps of causing the memory cells to assume a plurality of pseudo-random bit values includes:
   powering up the volatile memory with a power-up voltage that exceeds a threshold voltage of transistors of the memory cells to set each of the memory cells to store a first binary value; and
   allowing charge leakage of the memory cells to cause the stored value of one or more of the memory cells to change to a second binary value.

3. A method as claimed in claim 1, wherein the steps of causing the memory cells to assume a plurality of pseudo-random bit values include powering up the volatile memory with a power-up voltage that exceeds a threshold voltage of transistors of the memory cells, and further including detecting variations in start-up bit values corresponding to different instances of powering up of the volatile memory.

4. A method as claimed in claim 1, wherein the memory cells are dynamic random access memory (DRAM) cells:
   the steps of causing the memory cells to assume a plurality of pseudo-random bit values include storing a predefined set of bit values in the memory cells; and
   delaying some, but not all, of the plurality of memory cells to lose their predefined bit value as a function of their respective leakage rates.

5. A method as claimed in claim 1,
   wherein the step of generating the identifier includes averaging the first plurality of pseudo-random bit values, the second plurality of pseudo-random bit values, and at least one additional set of pseudo-random bit values.

6. A method as claimed in claim 3, wherein between steps (a) and (c), the power-up voltages for the memory are changed.

7. A method as claimed in claim 3, wherein steps (a) and (c) use different temperatures.

8. A method as claimed in claim 1, further including assigning the identifier to the semiconductor device.

9. A method as claimed in claim 8, further including storing the identifier in a database.

10. A method as claimed in claim 1, further comprising:
    loading a database of known identifiers;
    identifying the semiconductor device by comparing the generated identifier to the respective known identifiers in the database, and
    selecting one of the respective known identifiers based upon a comparison to the generated identifier.

11. A method as claimed in claim 10, wherein selecting the known identifier includes determining a difference between the generated identifier and the known identifier.

12. A method as claimed in claim 11, wherein determining a difference comprises determining a Hamming distance.

13. A method as claimed in claim 11, wherein determining a difference comprises determining a bit drift value.

14. A method as claimed in claim 1, wherein the semiconductor device further comprises:
    functionality requiring a key comprising a plurality of information symbols for its operation,
    an output; and
    means, including circuitry, for making the key available on the output;
    the method further comprising:
    providing a family of code words, each code word comprising a further plurality of information symbols;
    selecting one or more code words from the family;
    creating the key from the information symbols of the one or more code words; and
    making the key available on the output; and
    wherein the step of generating the identifier comprises creating a mapping function such that each bit value of the one or more code words is mapped onto a respective memory cell from which a corresponding identifier bit value is retrieved; and
    saving the mapping function on the semiconductor device.

15. A method as claimed in claim 14, further comprising modifying the key prior to making the key available.

16. A method as claimed in claim 14, further comprising disabling the means for providing the output with the key after making the key available.

17. A method as claimed in claim 14, wherein the step of creating a mapping function comprises creating a plurality of pointers to the respective memory cells.

18. A method as claimed in claim 14, wherein the step of creating a mapping function comprises:
   creating a bit table, each bit table cell corresponding with a memory cell of the at least the subset of the volatile memory; and
   providing each bit table cell with a bit value indicating the presence of the corresponding memory cell in the mapping function.

19. A method as claimed in claim 14, wherein the step of creating a mapping function comprises creating a permutation table for a set of memory cells.

20. A method of generating an identifier from a semiconductor device comprising a volatile memory having a plurality of memory cells, the method comprising:
   (a) causing the memory cells to assume a first plurality of pseudo-random bit values inherent to variations in the microstructure of the memory cells;
   (b) retrieving, by a processor circuit, the pseudo-random bit values from at least a subset of the plurality of memory cells;
   (c) causing the memory cells to assume at least a second plurality of pseudo-random bit values inherent to variations in the microstructure of the memory cells; and
   (d) generating the identifier by averaging at least some of the first plurality pseudo-random bit values and the at least second plurality of pseudo-random bit values, wherein the semiconductor device further comprises:
   functionality requiring a key comprising a plurality of information symbols for its operation; and
   a mapping function for mapping the bit values of one or more code words from a family of code words onto respective bit values of the identifier, each code word comprising a further plurality of information symbols;
   the method further comprising:
   retrieving the one or more code words from the identifier with the mapping function;
   error-correcting the one or more retrieved code words;
   creating the key from the information symbols of the one or more error-corrected code words; and
   operating the functionality using the key.

21. A method as claimed in claim 20, wherein operating the functionality comprises:
   receiving a further key;
   comparing the key to the further key; and
   allowing operation of at least a part of the semiconductor device if the key matches the further key.

22. A method as claimed in claim 20, wherein operating the functionality comprises receiving encrypted data; and processing the encrypted data with the key.

23. A method as claimed in claim 20, wherein operating the functionality comprises encoding data with the key; and transmitting the encoded data.

24. A method as claimed in claim 20, further comprising deleting the key after operating the functionality.

25. A semiconductor device comprising:
   a volatile memory having a plurality of memory cells; and
   a memory controller configured to
   cause the plurality of memory cells to assume a plurality of pseudo-random bit values that are responsive to variations in the microstructure of the memory cells by storing a predefined set of pseudo-random bit values in the plurality memory cells, and
   allowing at least one of the plurality of memory cells to lose their predefined value based upon a charge leakage rate of the memory cells; and
   retrieve, from at least a subset of the plurality of memory cells in response to losing their predefined value, an identifier including the respective pseudo-random bit values.

26. A semiconductor device as claimed in claim 25, further comprising an output coupled to the volatile memory; and wherein the controller is configured to provide the output with the respective bit values.

27. A semiconductor device as claimed in claim 25, wherein the memory controller is responsive to an external identifier generation request signal.

28. A semiconductor device as claimed in claim 25, wherein the memory controller comprises programmable memory means for storing a size of subset.

29. A semiconductor device as claimed in claim 27, wherein the memory controller is responsive to a boundary scan compliant test access port controller configured to process the external identifier generation request signal.

30. A semiconductor device as claimed in claim 25, further comprising:
   an output;
   functionality requiring a key comprising a plurality of information symbols;
   means for generating the key from the information symbols of one or more code words from a family of code words;
   means for generating a mapping function for mapping bits of the one or more code words onto respective bit values of the identifier;
   a non-volatile memory for storing the mapping function; and extracting means for
   extracting the key from the identifier with the mapping function.

31. A semiconductor device as claimed in claim 30, further comprising an input for receiving a further key, the functionality comprising authorizing means for authorizing access to the at least part of the semiconductor device, the authorizing means comprising a comparator for comparing the key with the further key.

32. A semiconductor device as claimed in claim 31, wherein the functionality comprises an encoder for encoding data with the key.

33. A semiconductor device as claimed in claim 30, wherein the functionality comprises a decoder for decoding data with the key.

34. A semiconductor device as claimed in claim 30, further comprising means for communicating the key to the output.

35. A semiconductor device as claimed in claim 33, wherein the means for communicating the key are disabled.

36. A method of generating an identifier from a semiconductor device including a volatile memory having a plurality of memory cells, the method comprising:
   storing a first predefined set of bit values in the memory cells by powering-up the memory cells using a first power-up voltage;
   causing at least one of the plurality of memory cells to lose the first predefined bit value according to a pseudo-random parameter that includes charge leakage rate of the memory cells;
   retrieving, by a processor circuit, the first predefined bit values from at least a subset of the plurality of memory cells thereby creating a first set of retrieved bit values;

storing a second predefined set of bit values in the memory cells by powering-up the memory cells using a second power-up voltage that is different from the first power-up voltage;

causing at least one of the plurality of memory cells to lose the second predefined bit value according to the pseudo-random parameter that includes charge leakage rate of the memory cells;

retrieving the second predefined bit values from at least a subset of the plurality of memory cells thereby creating a second set of retrieved bit values; and generating the identifier by combining the first set of retrieved bit values and the second set of retrieved bit values.

37. The method of claim 36, wherein the step of causing at least one of the plurality of memory cells to lose the first predefined bit value and the step of causing at least one of the plurality of memory cells to lose the second predefined bit value includes using a programmable predefined delay.

* * * * *